(12) United States Patent
Chen

(10) Patent No.: US 7,136,362 B2
(45) Date of Patent: *Nov. 14, 2006

(54) METHOD OF OPERATING A MOBILE TELECOMMUNICATIONS NETWORK

(75) Inventor: Xiaobao X Chen, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 819 days.

This patent is subject to a terminal disclaimer.

(21) Appl. No.: 09/918,174

(22) Filed: Jul. 30, 2001

(65) Prior Publication Data

US 2002/0021688 A1    Feb. 21, 2002

(30) Foreign Application Priority Data

Aug. 21, 2000  (GB) ................ 0020580.7

(51) Int. Cl.
*H04Q 7/00* (2006.01)
*H04J 3/24* (2006.01)
(52) U.S. Cl. ............ 370/328; 370/349; 370/475; 455/432.1
(58) Field of Classification Search ........... 370/310, 370/328, 331, 389, 392, 475, 900, 912–913; 455/432.1, 433, 436, 440; 379/900
See application file for complete search history.

(56) References Cited

U.S. PATENT DOCUMENTS

| 6,501,746 | B1* | 12/2002 | Leung ............ 370/338 |
|---|---|---|---|
| 6,574,214 | B1* | 6/2003 | Khalil et al. ............ 370/349 |
| 6,578,085 | B1* | 6/2003 | Khalil et al. ............ 709/241 |
| 6,751,477 | B1* | 6/2004 | Alperovich et al. ...... 455/560 |
| 6,765,892 | B1* | 7/2004 | Leung et al. ............ 370/332 |
| 6,829,483 | B1* | 12/2004 | Chen ................ 455/452.2 |
| 6,842,456 | B1* | 1/2005 | Chen et al. ............ 370/401 |
| 6,915,325 | B1* | 7/2005 | Lee et al. ............ 709/202 |

FOREIGN PATENT DOCUMENTS

| EP | 1 009 134 | 6/2000 |
|---|---|---|
| EP | 1 032 178 | 8/2000 |

OTHER PUBLICATIONS

Perkins, C.E., Mobile IP, Communications Magazine, IEEE vol. 35, Issue 5, May 1997 pp. 84-99.*
Perkins, C.E., Mobile Networking through Mobile IP, Internet Computing, IEEE vol. 2, Issue 1, Jan.-Feb. 1998 pp. 58-69.*

(Continued)

*Primary Examiner*—Chi Pham
*Assistant Examiner*—Tri H. Phan

(57) ABSTRACT

In a third generation mobile telecommunications network, when a mobile is in a foreign network, packets are addressed to it by a home agent which changes the header so that the source address is the home agent address and the destination address is the Care of Address of the mobile. Identifier codes for the mobile node and correspondent node are included in the packet header, and tables of identifier codes and the correspondent nodes are retained by the home agent and sent to a foreign agent (FA COA working) or mobile node (CO-COA working) which readdress each received packet, to a higher layer or to an application, as appropriate.

In this non-encapsulated mode of working, packets are not rejected by a firewall or by egress filtering.

10 Claims, 3 Drawing Sheets

OTHER PUBLICATIONS

Bhagwat, P.et al, Network Layer Mobility: An Architecture and Survey, Personal Communications, IEEE [see also IEEE Wireless Communications] vol. 3, Issue 3, Jun. 1996 pp. 54-64.*

C. Perkins, "Minimal Encapsulation within IP; RFC2004", *Retrieved from the Internet*: http://www.ietf.org/rfc/rfc2004, (Oct. 1996), p. 2, line 1-22; p. 3, line 1—p. 4, line 7.
European Search Report.

* cited by examiner

METHOD OF OPERATING A MOBILE TELECOMMUNICATIONS NETWORK

CROSS-REFERENCE TO RELATED APPLICATION

This application claims priority of Great Britain Patent Application number 0020580.7, which was filed on 21$^{st}$ Aug. 2000.

BACKGROUND OF THE INVENTION

1. Field of the Invention

This invention relates to an improved method of operating a mobile telecommunications network, especially a method of addressing packets destined for a mobile terminal in a foreign network.

2. Description of the Related Art

In third generation telecommunications networks such as GPRS (General Packet Radio Service) and EDGE (Enhanced Data-rate for GSM Evolution), when a mobile terminal moves into a foreign network, network connectivity is optionally maintained by the use of Mobile Internet Protocol (Mobile IP). In the home network, a Home Agent (HA) is set up which maintains the location information of the mobile by use of Binding Updates, i.e., registration of information sent to the HA by the mobile node.

Mobile IP has two working modes. The first is illustrated in FIG. 1; a mobile terminal is currently attached as Mobile Node (MN) 14 in a network different from its home network. The MN 14 is communicating with a Correspondent Node (CN) 12. A Home Agent 16 is set up in the home network by the CN 12, and a Foreign Agent (FA) 18 is set up in the foreign network. The FA 18 allocates a unique IP address for the visiting mobile, a Care of Address (COA) and this address is sent to the HA 16 in a Binding Update.

Packets for the mobile are encapsulated by the HA 16 and tunnelled along tunnel 20 to the FA 18 for transmission to MN 14. In such encapsulation, an extra IP header is added to each packet, including the COA of the MN 14. This is known as FA-COA working mode.

In the second working mode (not illustrated) there is no FA, the MN 14 is allocated a unique COA and encapsulated packets are tunnelled by HA 16 directly to MN 14; this is known as Colocated Care of Address mode of working (CO-COA).

In both FA-COA and CO-COA modes of working, the encapsulation generates extra headers, and possibly only small payloads can be used, which results in inefficient transmission and inefficient use of expensive system and network resources, such as radio links. Further, encapsulation hides the flow identification, and the differentiation of classes of services is thus also disabled, so that Quality of Service (QoS) provision mechanisms, such as RSVP (Resource reservation Protocol) Int Serve, must be changed.

The disadvantages of encapsulation can be avoided by the use of Non Encapsulation Mobile IP technique, as set out in the applicant's co-pending patent application "Non-encapsulation Mobile IP" filed on 26 Feb. 1999 as no. 99301437.2. In this technique, the current COA of the mobile node is used as the destination address, and the original source address, i.e. the CN address, is maintained. For FA-COA working, this deletes a header of length at least 20 bytes and introduces a header of only 2 bytes; for CO-COA mode of working no header is introduced. However a disadvantage is that any firewall or egress filtering in the home network may reject such packets, because they have a source address different from the home network address.

SUMMARY OF THE INVENTION

It is an object of the invention to provide a method of packet addressing which overcomes the disadvantages set out above, and allows QoS to be provided.

According to the invention a method of operating a third generation mobile telecommunications system in which packets are addressed to a mobile node which is currently associated with a foreign network and is communicating with a correspondent node, comprising the steps of:

setting up a home agent in the home network and allocating a Care of Address in the foreign network for the mobile node;

characterized by the further steps of:

changing the packet header so that the source address is the home agent address, the destination address is the Care of Address and the header further includes a correspondent node identifier code and a mobile node identifier code.

Usually the home agent will change the packet header.

BRIEF DESCRIPTION OF THE DRAWINGS

FIG. 1 illustrates a known working mode of Mobile IP. The invention will now be described by way of example only with reference to FIGS. 2 to 4 in which:

DETAILED DESCRIPTION

Figure 1:
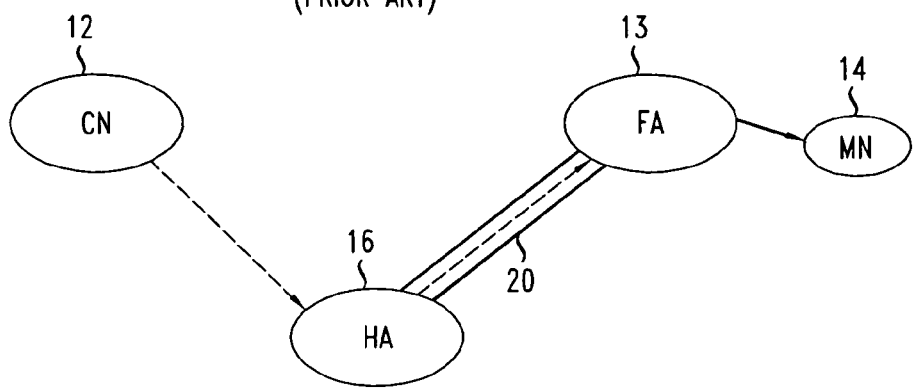
Figure 2A:
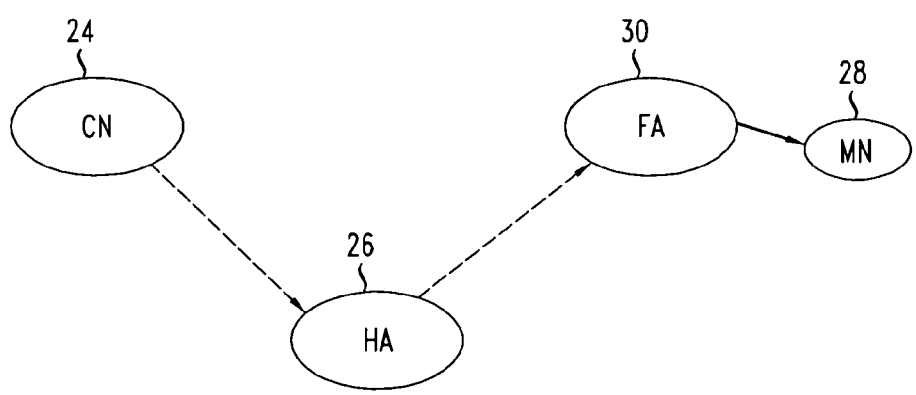
FIG. 2a illustrates the invention operating in FA COA mode.
Figure 2B:
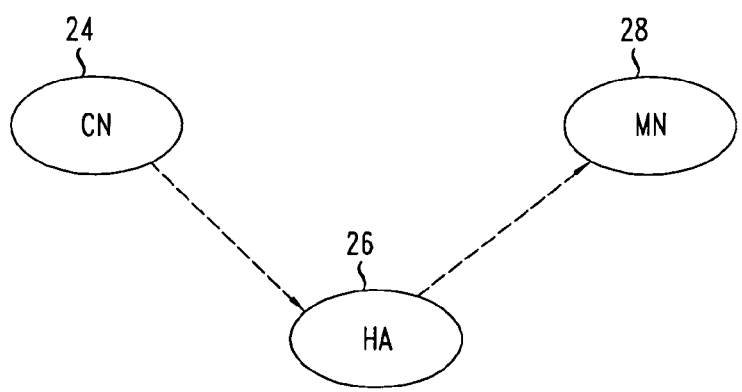
FIG. 2b illustrates the invention operating in CO-COA operating mode.

In FIG. 2a, which is similar to FIG. 1, a mobile terminal MN 28 has a FA 30. CN 24 has a HA 26; the figure illustrates FA COA mode. In FIG. 2b, the mode is CO-COA, therefore there is no FA and packets pass directly to MN 28.

It will be seen that, in comparison with FIG. 1, FIGS. 2a and 2b do not have a tunnel from HA 26 towards either FA 30 or MN 28. This is because in the inventive arrangement the packets are not encapsulated and therefore no tunnel is needed. A suitable name and acronym for the inventive technique is Non-Encapsulation Mobile Internet Protocol, NEMIP.

Figure 3A:
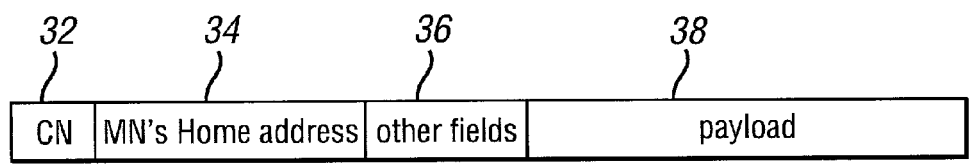
FIG. 3a illustrates a prior art packet header format.

In FIG. 3a, a packet 30 conventionally addressed to a mobile in a foreign network has as source address 32 the IP address of CN 24; and as destination address 34 the home address of MN 28. FIG. 3a also illustrates payload 38 and other fields 36.

Figure 3B:
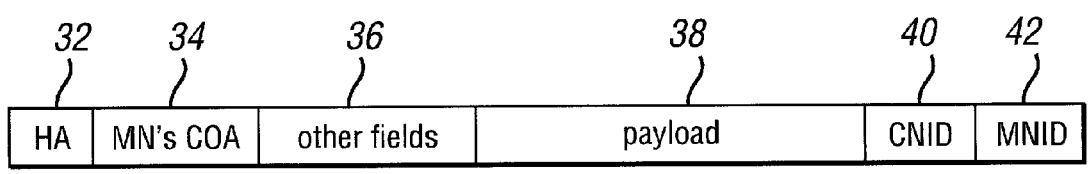
FIG. 3b illustrates a packet header format according to the invention.

In FIG. 3b, in a header according to the invention, the source address 32 is the address of HA 26 and the destination address 34 is the COA of MN 28. The header contains two new fields, 40, 42, containing respectively identifiers (ID) for CN 24 and MN 28.

When the network is operating in FA COA as illustrated in FIG. 2a, the re-addressed packet is received by the FA 30 and the MN ID 42 is used by the FA to distinguish the different mobile nodes which are simultaneously using that FA, and the packet is routed to MN 28.

When the re-addressed packet is received by FA 30 (for FA COA mode, FIG. 2a) or by MN 28 (for CO-COA mode, FIG. 2b), the CNID 40 is used by the FA or the MN to recover the original source address, i.e. the address of the CN 24; the FA 30 or the MN 28 then re-calculates the checksum of the packet, and delivers it to an application.

Considering now the CNID 40, this unique identifier is allocated by HA 26 as soon as a packet addressed to the address of mobile is detected. The HA 26 adds an entry to an address mapping table of CNIDs and CNs, which is maintained by HA 26. Then the HA 26 sends the CNID plus the IP address of the correspondent CN to FA 30 (FA COA mode) or to MN 28 (CO-COA mode); either a registration reply message, or a separate CNID notification message can be used.

When the CNID is received by FA 30 or by MN 28, an entry is added to a CNID-to-CN IP address mapping table which is maintained by the FA or MN.

Information about MNs and MN IDs is similarly exchanged.

As each packet destined for MN 28 arrives at HA 26, the HA looks up the CNID and CN address mapping table to find the CNID corresponding to the source address on the packet; the HA then replaces the original source address with the HA address, and the destination address with the COA of MN 28. The HA 26 adds a CNID field 40 and an MN ID field 42, adjusts the packet checksum, and dispatches the packet.

When the packet arrives at the FA 30 or MN 28, the CNID-to-CN table is looked up and the source address of the HA 26 is replaced by the real address of CN 24, and the destination address is replaced with the home address of the mobile. For FA COA mode, the MNID-to-MN table is looked up, as explained above. The checksum is adjusted and the packet is delivered to the MN 28 (for FA COA mode) or the an application (for CO-COA mode).

The CNID and MNID formats can be very short and simple, so that the additional fields do not substantially increase the header length.

The method of packet heading according to the invention for a mobile in a foreign network retains the advantage of shorter headers, and higher payloads, in common with the invention set out in the copending patent application no. 99301437.2r referred to above. Since the HA address is used as the source address, the problems during egress filtering caused by using a source address different from the home network address can be avoided. Since the destination address is changed back before a packet is delivered, an application to which the packet is delivered does not need to be reconfigured, so irritating stops and re-starts of the application are avoided.

A further advantage is that only the source and destination addresses of the header are changed; all other information is unchanged, including information identifying the traffic flows from the HA 26 to the current COA of MN 28. It is therefore possible to adopt a standard QoS arrangement, such as RSVP, without modification to provide QoS services to the mobile.

A QoS session will now be described using RSVP as an example.

Figure 4:
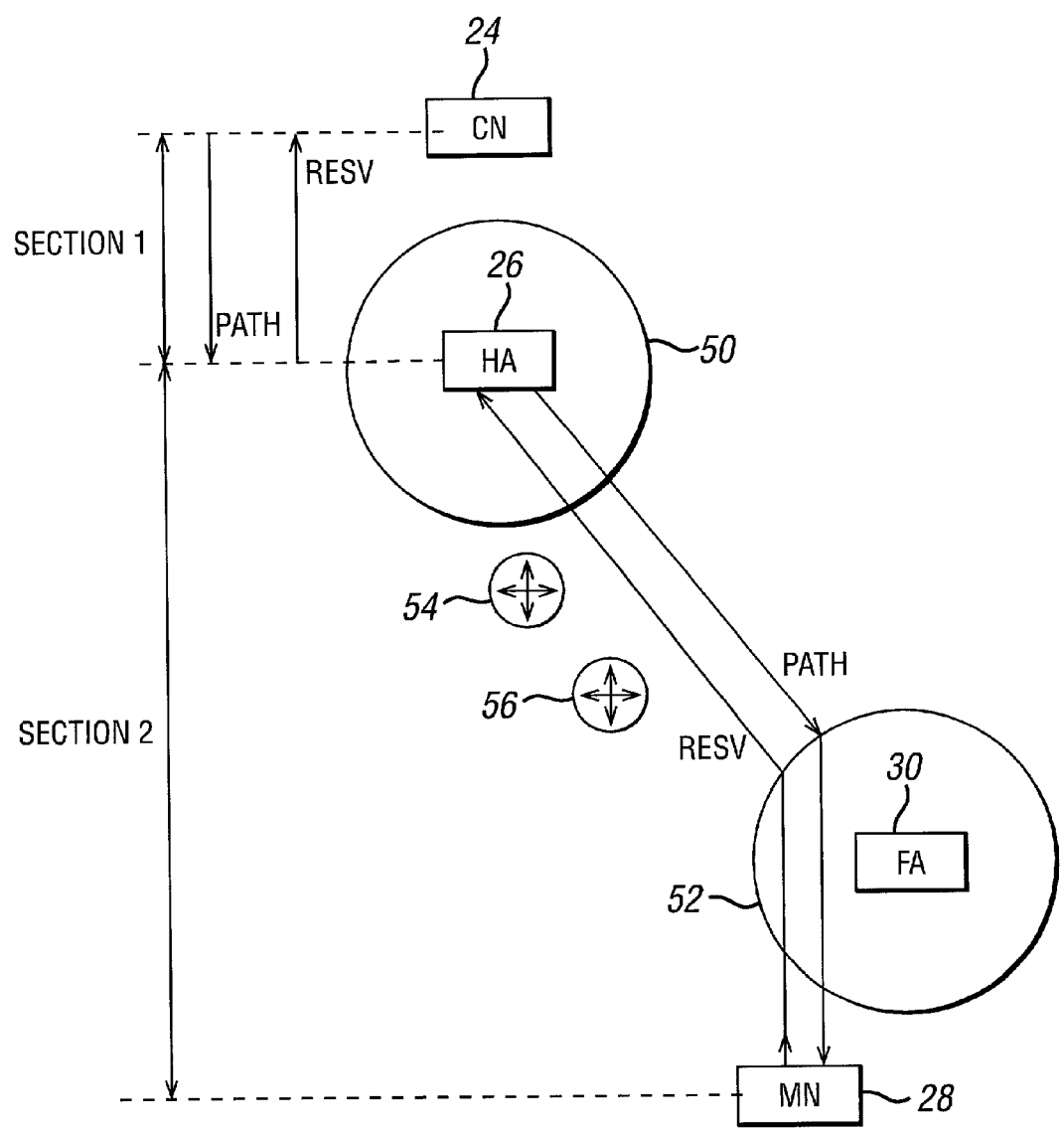
FIG. 4 illustrates a RSVP session.

In FIG. 4, the CN 24 and HA 26 are associated with home network 50, and the MN 28 and FA 30 are associated with a foreign network 52. The RSVP session is set up as two parts, shown as Section 1 and Section 2 on the Figure; Section 1 operates between the CN 24 and the HA 26, and Section 2 operates between the HA 26 and MN 28.

Section 1 is set up as a normal RSVP session in a non-mobile environment, with a path message sent from CN 24 to HA 26; the difference in the inventive arrangement is that the return RESV message from the HA 26 to CN 24 is not initiated until Section 2 has been completed.

Section 2 covers the MN 28, and is dynamically adapted as the mobile moves from one network to another.

When HA 26 receives the PATH message from the CN 28, with the source and destination address being the CN 24 and the home address of MN 28, the HA 26 intercepts the packet and modifies or regenerates a PATH message via an RSVP proxy server by re-addressing the packet as described above. The packet passes through a number of nodes or network routers, and two routers, 54, 56, are illustrated. The PATH message is an end-to-end message. The proxy server can be attached to HA 26 or it can be a separate entity.

In foreign network 52, a foreign proxy server or its equivalent in the MN 28 or FA 30, depending on the working mode, prepares a RESV message with the COA address of MN 28 as the source address and the HA's destination address; the message contains flow identification information such as protocol ID as well as source/destination port numbers, and is dispatched. The RESV message is routed hop-by-hop through the same servers 54, 56 as the PATH message, but in the reverse direction; the source and destination addresses for each hop are changed appropriately by the routers 54, 56.

When the RESV message is received by HA 26, or an equivalent such as a home network proxy server, the RESV message is modified or regenerated with the home address of MN 28 as source address and the CN 24 as destination address; i.e. Section 2 is completed. The RESV message of Section 1 is now sent in conventional manner.

When the CN 24 or the home network proxy server receives the RESV message, a RESV confirmation message can, if requested, be sent to confirm the whole RSVP session.

When the mode of working is FA COA, to guarantee flow-specific identity, and this class of service differentiation, for Section 2 of the RSVP session, Port Clash avoidance control is necessary; any known technique can be applied.

I claim:

1. A method of operating a third generation mobile telecommunications system, in which packets, each having a source address and a destination address in its packet header, are addressed to a mobile node which is a user node having a home network and currently associated with a foreign network and which is communicating with a correspondent node which is another user node and has a correspondent node address, comprising the steps of setting up a home agent having a home agent address in the home network and allocating a Care of Address for the mobile node;

receiving a packet at the home agent from the correspondent node, the packet having a packet header which includes the correspondent node address as the source address; and changing the packet header to change the source address from the correspondent node address to the home agent address, to change the destination address to the Care of Address, and to add a correspondent node identifier code, which identifies the correspondent node, and a mobile node identifier code, which identifies the mobile node.

2. A method according to claim 1 in which the Care of Address is the address of the mobile node.

3. A method according to claim 1 in which the Care of Address is the address of a foreign agent in the foreign network.

4. A method according to claim 1 in which the packet header is changed by the home agent.

5. A method according to claim 4 comprising the further steps of:
- the home agent retaining a record of the correspondent node and correspondent node identifier codes; and
- the home agent sending a copy of said record to the destination address in the Care of Address at which said record is also stored.

6. A method according to claim 5 in which when a packet arrives at the destination address in the Care of Address, the destination checks the stored record and replaces the correspondent node identifier code in the header with a home address of the correspondent node.

7. A method according to claim 1 comprising the further steps of:
- the home agent retaining a record of the mobile node and mobile node identifier code; and
- sending a copy of said record to the Care of Address at which said record is also stored.

8. A method according to claim 7 in which, when the packets arrive at the Care of Address, a foreign agent checks the stored record and replaces the mobile node identifier code in the header with a home address of the mobile node.

9. A method of operating a third generation mobile telecommunications system, in which packets are addressed to a mobile node which is a user node currently associated with a foreign network and is communicating with a correspondent node which is another user node, comprising the steps of
- setting up a home agent in a home network and allocating a Care of Address for the mobile node;
- the home agent changing a packet header so that a source address is a home agent address, a destination address is the Care of Address, and the header further includes a correspondent node identifier code and a mobile node identifier code;
- the home agent retaining a record of the correspondent node and correspondent node identifier codes; and
- the home agent sending a copy of said record to the destination address in the Care of Address at which said record is also stored.

10. A method according to claim 9 in which when a packet arrives at the destination address in the Care of Address, the destination checks the stored record and replaces the correspondent node identifier code in the header with a home address of the correspondent node.

* * * * *